United States Patent [19]
Allard et al.

[11] Patent Number: 4,750,888
[45] Date of Patent: Jun. 14, 1988

[54] METHOD AND DEVICE FOR TRAINING IN THE OPERATION OF MOVING VEHICLES

[75] Inventors: Jean-Claude Allard, Bourg la Reine; Christian Deslypper, Cergy; Christian Saunier, Ermont, all of France

[73] Assignee: Giravions Dorand, Suresnes, France

[21] Appl. No.: 680,394

[22] Filed: Dec. 11, 1984

[30] Foreign Application Priority Data

Dec. 15, 1983 [FR] France ............................... 83 20136

[51] Int. Cl.⁴ ............................................. G09B 9/04
[52] U.S. Cl. ...................................... 434/69; 434/64; 434/65; 434/71
[58] Field of Search ....................... 434/43, 62, 64, 65, 434/69, 70, 71

[56] References Cited
U.S. PATENT DOCUMENTS 4,383,827 5/1983 Foerst ................................... 434/69

OTHER PUBLICATIONS

"Living Pictures", John Free, *Popular Science* Aug. 1981, pp. 68–70.

Primary Examiner—Leo P. Picard
Attorney, Agent, or Firm—Felfe & Lynch

[57] ABSTRACT

Training in the operation of moving vehicles is provided by an operating station comprising a steering wheel and a television monitor screen placed in front of the trainee driver. Theoretical steering control operations performed by a model driver on a previously recorded moving road landscape are used for producing the images of the road landscape as it moves in front of the trainee driver's control station. Steering errors made by the trainee driver are determined by comparison between the steering control operations performed by the trainee driver and the previously recorded model-driver steering control operations. Displacement of the images with respect to the television monitor screen is produced as a function of the trainee driver's steering errors.

7 Claims, 3 Drawing Sheets

METHOD AND DEVICE FOR TRAINING IN THE OPERATION OF MOVING VEHICLES

BACKGROUND OF THE INVENTION

1. Field of the Invention

This invention relates to methods and devices for simulation of the type employed for training in the operation of moving vehicles and especially automotive vehicles.

2. Description of the Prior-Art

In accordance with known practice, a trainee driver is seated at an operating station which is similar to that of an automobile, for example. A road or landscape display moved in front of the driver is controlled as a function of operating orders which are given by the driver by actuating a steering wheel at the operating station. In practice, a projected film reproduces a road seen through the windshield of a vehicle.

In actual fact, however, the known devices are suitable only for activities relating to games. The images which it is known to project in front of the driver in a simulation by means of these devices produce effects so far remote from real conditions that there cannot be any question of real training which permits the acquisition of the necessary reflexes at the wheel of an automobile and even less the acquisition of the automatic reflexes required for driving or steering vehicles of faster types.

SUMMARY OF THE INVENTION

The precise aim of the present invention is to permit training at a much higher level of proficiency than it is possible to attain with operating stations of the type at present used for games. This result is achieved by simulating steering errors made in orders given to the operating station and the effect which would be produced by such errors under real driving conditions.

Thus the invention is directed to a method for training in the operation of moving vehicles in an operating station comprising a steering element to be operated by a trainee driver and means for displaying a landscape which is moving in front of the driver, the method being distinguished by the fact that:
a display window is determined in front of the driver;
a previously recorded landscape which has moved in front of a model driver is used for producing the images of said moving landscape in front of the operating station;
the steering errors made by the trainee driver are determined by comparison between the control operations performed on the steering element by the trainee driver and the previously recorded model control operations performed by the model driver;
and a displacement of the images with respect to the display window is produced as a function of said errors.

Although the invention is primarily applicable to training in the driving of vehicles of the automobile type, it will be understood that this application does not imply any limitation. And when using certain expressions which relate more specifically to automobiles, it must be understood that they include within their meaning any other equipment element employed in other applications. In particular, the steering wheel of a car can equally well be an aircraft control column or joystick, or any other vehicle steering control element, whilst the term "road" can represent any type of landscape surrounding the path of travel to be followed by the operator.

In a preferred mode of execution of the method according to the invention, the images to be displayed are produced by reading a videodisk comprising simultaneous recordings of the moving landscape and control operations carried out by the model driver. In a particularly advantageous manner, moving-landscape recording is carried out in a compressed form in at least one direction corresponding to that of the possible steering errors, starting from the landscape as seen by the model driver at a wider angle than that of the display window. The images of the moving landscape are then produced in front of the operating station by reading said compressed recording, carrying out an expansion which compensates for compression at the time of recording, and selection of a portion of the expanded recording to be displayed in said window.

Furthermore, in accordance with another distinctive feature of the invention, the steering errors are determined from the variation in orientation of the steering element of the model control operations during a unitary time interval by making a comparison between the control operation of the trainee driver and a recording performed at a constant driving speed imposed on the vehicle.

The invention also relates to a device for training in the driving of moving vehicles which essentially comprises means adapted to carry out the method hereinabove defined.

The detailed description given below will relate to a particular embodiment which is chosen by way of non-limitative example in order to gain a more complete understanding of the essential features and advantages of the invention.

BRIEF DESCRIPTION OF THE DRAWINGS

Other features of the invention will be more apparent upon consideration of the following description and accompanying drawings, wherein:

FIG. 5 illustrates the calculations performed by the computer of the device.

DETAILED DESCRIPTION OF THE INVENTION

Figure 1:
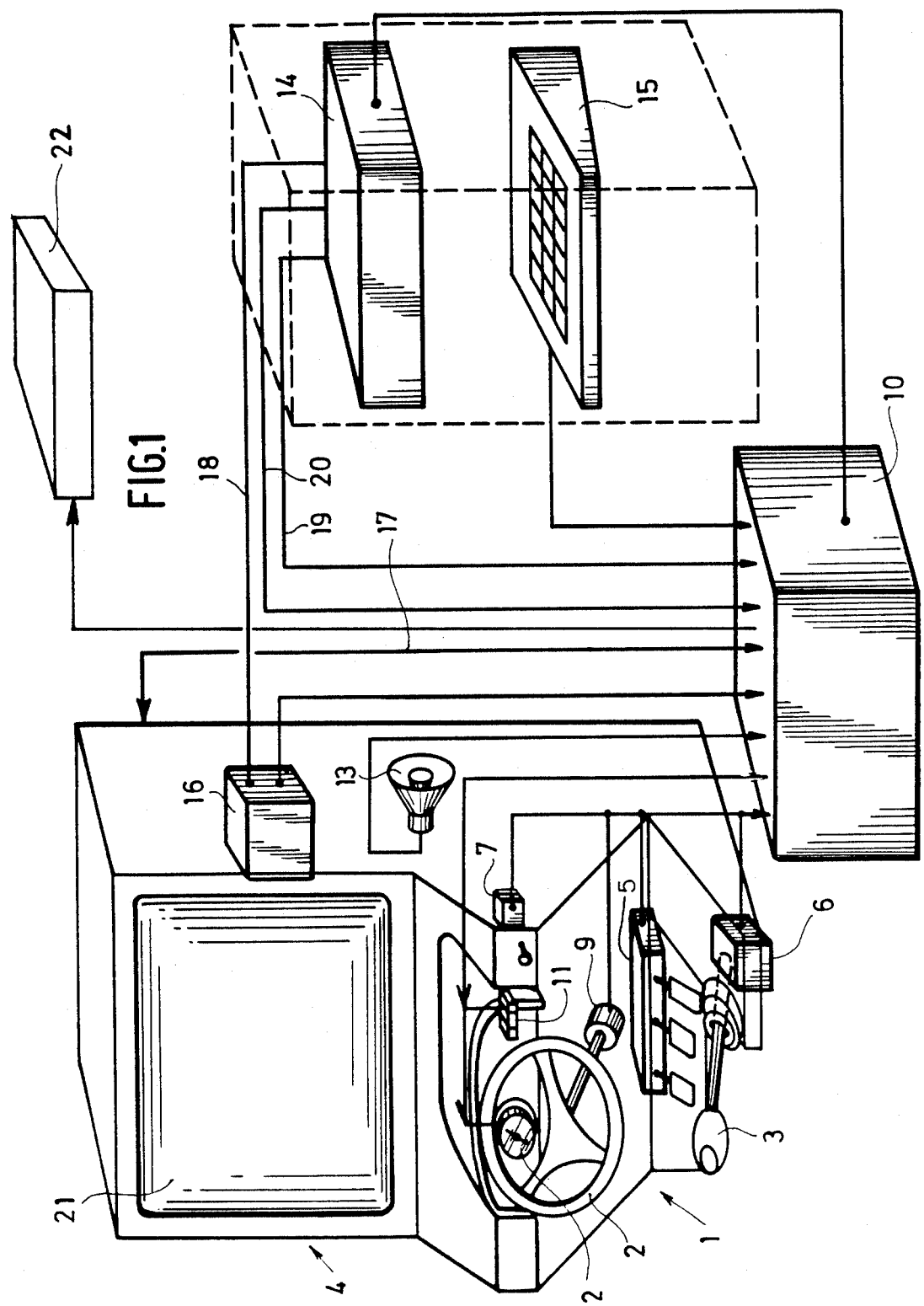
FIG. 1 illustrates diagrammatically the composition of a simulating device in accordance with the invention for training in the driving of automobiles.

In accordance with FIG. 1, a device in accordance with the invention, in the particular case of the embodiment herein described, comprises an automobile operating station 1 in which is shown the steering wheel 2 and the gear shift lever 3 in particular. The seat on which the trainee driver is seated in order to operate the steering wheel 2 in a training procedure has not been illustrated. However, there is shown in the drawings a display device 4 represented in the form of a television monitor.

The device is controlled by a microprocessor computer 10. In accordance with the connections shown in the figure, said computer receives data representing the different operational control orders given by the trainee driver at the operating station 1 during a training session. These data are delivered by sensors 5, 6, 7, 9 in which the sensor 5 in particular is responsive to the movements imparted to the accelerator pedal of the operating station and the sensor 9 detects the angular orientation of the steering wheel 2 with respect to a reference orientation corresponding as a rule to a vehicle which is traveling in a straight line. The computer 10 will therefore be capable of taking into account in its calculations, not only the direction followed by a vehicle which is thus driven under simulated conditions, but also the speed and acceleration of the vehicle.

In addition, the operating station 1 receives data from the computer 10 which initiates operation of indicators 11, 12 including in particular a speedometer 12 in order to simulate the functions which these indicators would perform in a real vehicle. The computer can likewise control the operation of ancillary equipment units which are illustrated in the particular case considered in the form of a loudspeaker 13 for simulating engine noise. The same computer 10 controls the television monitor 4 and the definition of the images displayed on its screen 21. It is for this reason that there is shown in FIG. 1 a line 17 for transmission of the video signal and a unit 16 for imposing a spatial displacement on the line scan which ensures reconstruction of the images in accordance with the video signal data.

Other data processed by the computer 10 are orders given by an instructor by means of a control desk 15. In particular, these orders define the choice of a training sequence among several alternatives of orders for initializing an exercise or orders for stopping the performance of an exercise, for example at a stage on which the instructor desires to comment.

The last essential element of FIG. 1 is a video-disk reader 14 which has the function of reading a recording medium consisting of a videodisk in the example under consideration. Starting and stopping of reading operations as well as reading speed are controlled from the computer 10. The reader 14 is connected to the computer 10 by means of two data transmission lines, namely a line 19 for transmitting a video signal which defines the images to be displayed and a line 20 for transmitting various data recorded on the sound recording channels of the videodisk. Finally, a line 18 effects synchronization between the reader 14 and the control unit 16 of the television monitor. A video tape recorder 22 can record the driving sequences of the trainee as well as any references of the model in order to permit re-display of the training sequences for comments.

Figure 2:
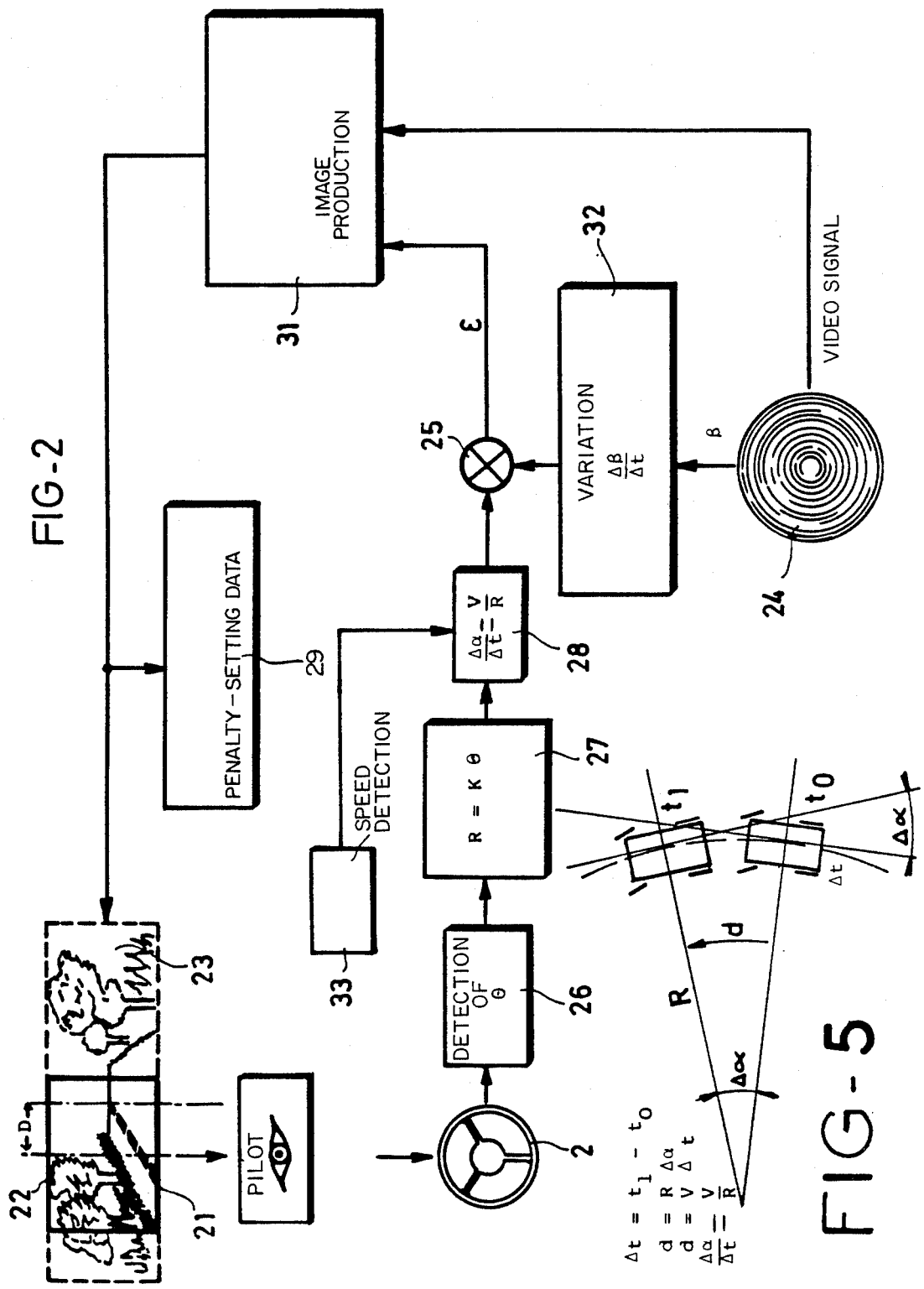
FIG. 2 is a block diagram of operation of the device.

The method will now be described with reference to FIG. 2 in regard to the operations performed by the computer 10. The block diagram provided in this figure shows the display window 21 formed by the screen of the monitor 4, the steering wheel 2 operated by the trainee driver and the videodisk 24, the recordings of which are read by the reader 14. The videodisk 24 carries a recording of images from which the images to be displayed in front of the trainee driver will be produced and also carries various data recorded on the two channels which are usually reserved for sound in conventional videodisks. One of these channels can be employed for reproduction of sound effects. The other channel is assigned to recording of data relating to the theoretical operation by the model driver, or "model operation".

The mode of execution herein described presupposes that the image data and theoretical operation data respectively have been recorded simultaneously in the form of successive values of the angle of orientation of the vehicle with respect to a fixed reference axis. By way of alternative, it is possible to employ a recording on electronic cassette. A "memory" cassette of this type associated with the videodisk performs in this case the function of the channel mentioned above and the data contained in said cassette and recorded from the model operation are read in combination with the images derived from the videodisk.

Furthermore, recording of the road as it passes in front of the model driver is assumed to have been performed while said model driver was traveling at a relatively low and constant speed. It should be understood that this constant speed is chosen so as to remain usually lower than the average speed which will be adopted by the trainee driver.

During a training period, the trainee driver follows in principle the same road as the model driver, making allowance for errors, but he or she has no reason to follow the same road at the same speed. The operational program of the computer is so designed as to control the display of images of the road which passes in front of the trainee driver while taking into account, not only the driving errors which produce a difference in orientation of the vehicle with respect to the orientation recorded on the videodisk in the case of the image of the same point on the road, but also the effect of the speed of the vehicle on the image seen by the driver. In other words, the effect simulated is a reaction to displacements of the steering wheel as a function of the speed of travel on the road.

To this end, it is necessary to detect at 26 the angle of rotation $\theta$ of the steering wheel with respect to a fixed direction, to calculate at 27 the radius of curvature of the path of travel of the vehicle, namely R, and to calculate at 28 a value which will subsequently be compared in the comparator 25 with the corresponding value determined at 32 from the information contained in the videodisk. The incidence of the rate of travel of road images is already present in the determination of the reading orders given to the videodisk reader. By varying the speed of the videodisk reader, the successive images of the recording will be reproduced at the display terminal at a frequency which will be higher or lower as a function of the variation in speed, the reference being always with respect to the constant speed adopted by the model driver for picture-taking.

The values compared at 25 are accordingly as follows:

on the one hand $\Delta\beta/\Delta t$ where $\Delta\beta$ is the variation in orientation during an arbitrary unitary time interval $\Delta t$, the variations in the angle $\beta$ being recorded during the model operation;

on the other hand $\Delta\alpha/\Delta t$ where $\Delta\alpha$ is the variation in orientation during trainee operation in respect of the same unitary time interval.

The ratio just given is calculated at 28, as will be found in FIG. 5 and justified by the equation:

$$\frac{\Delta\alpha}{\Delta t} = \frac{V}{R}$$

where

V is the speed derived from the action on the accelerator pedal and detected at 33, and R is the radius of curvature calculated at 27.

The comparator 25 delivers a signal ε which represents the difference between the two compared values. This signal serves to produce a proportional lateral displacement of the center of the displayed image. In order to permit this displacement, there is provided at the display terminal an image 23 of greater width than the image which can normally be seen through the vehicle windshield but only a portion 22 of this image is shown in the display window formed by the screen 21, this portion being selected according to the desired extent of displacement. The production of the image 23 is carried out at 31 by means of the video signal read from the videodisk as well as the selection of the portion 22 to be displayed as a function of the image-displacement instructions.

Finally, provision has been made for an arrangement such that the computer produces at 29 penalty-setting data according to the values assumed by the difference determined by the comparison at 25. It is thus possible to initiate, for example, either turn-on of special warning lamps or the appearance of corresponding indications by insertion in the displayed image.

In order to be able to obtain the wide image 23, recording on the videodisk is carried out by filming the real road through an anamorphic lens so as to produce an image which covers a wide horizontal field of cinemascope format. This image is compressed in width when it is recorded while conforming to the usual standards of the videodisk. At the time of reproduction, the image is expanded horizontally in inverse ratio to the image of the anamorphic lens. The image is then restored to a correct geometry but its width is greater than that of the screen of the television monitor.

Figure 3:
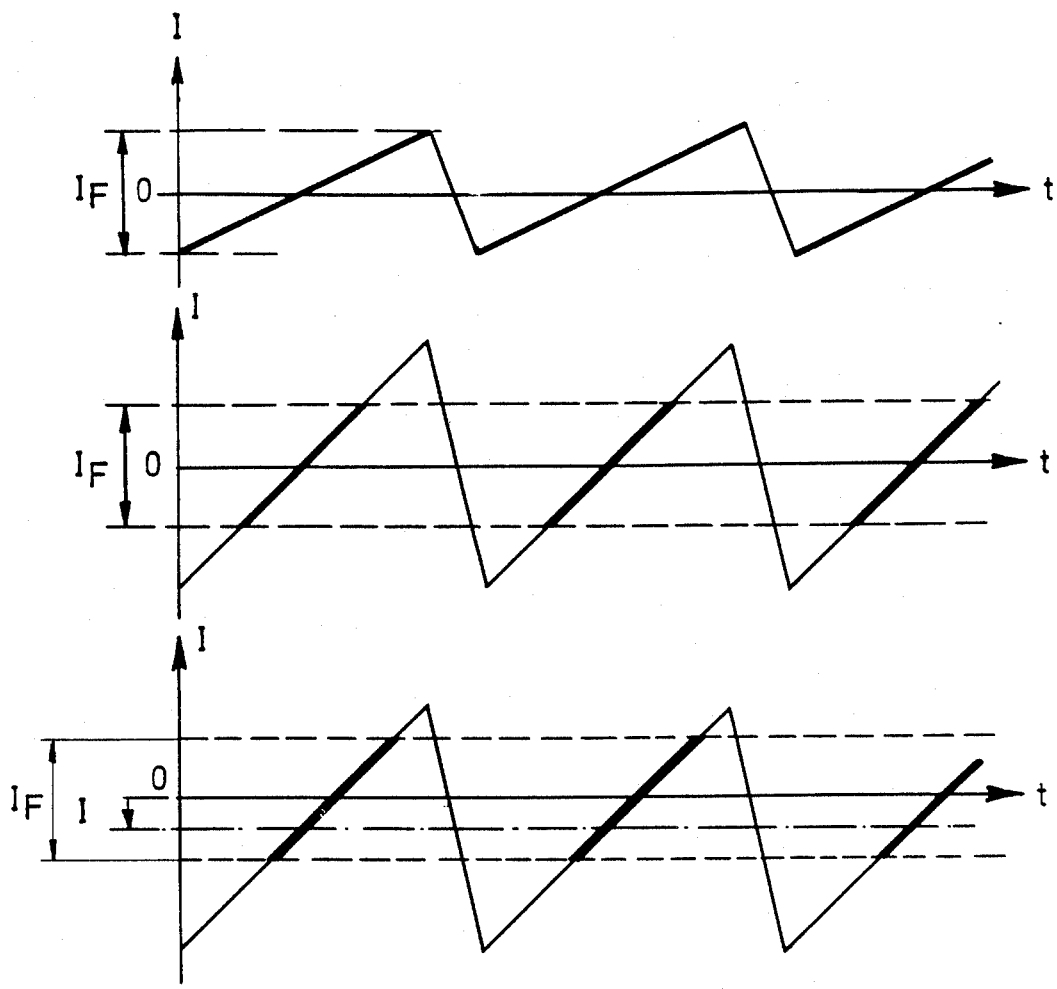
FIG. 3 illustrates the processing of video signals which produce the displayed images.
Figure 4:
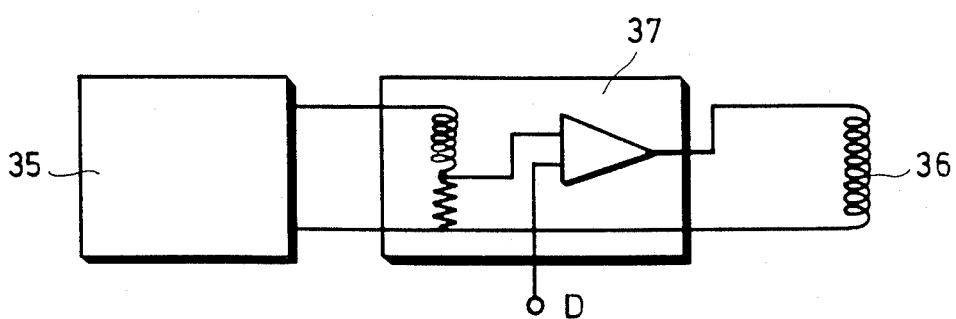
FIG. 4 illustrates diagrammatically a display control circuit which has been modified for processing said video signals.

The curves of FIG. 3 illustrate the method adopted for obtaining expansion of the compressed image and lateral displacement of the portion of displayed image by means of a control unit shown diagrammatically in FIG. 4. A complementary circuit 37 is added to the usual circuits 35 which control the beam deflection in the line scan (horizontal scan) by means of a coil 36. The function of said complementary circuit is to amplify the scanning-beam current and to add thereto a current having a value which is proportional to the lateral displacement of the image to be obtained. The waveform or curve of variation of the scanning-beam current I as a function of the time interval t accordingly undergoes a transition from the shape corresponding to the compressed image represented by the first curve of FIG. 3 to the shape of the second curve by amplification in the case of the expanded image, then from the shape of the second curve to that of the third curve by addition of a constant current Id for the lateral displacement. Only those portions of the waveform which appear in thicker lines give rise to a line scan which is located within the frame of the television monitor screen which therefore represents the selection of that portion of the expanded image which is to be displayed.

As will readily be apparent, the invention is not limited in any sense to the distinctive features specified in the foregoing or to the details of the particular embodiment which has been chosen and which is to be interpreted as illustrative. A variety of changes may be made in the particular construction herein described by way of example and in its constituent elements without thereby departing either from the scope or the spirit of the invention. This invention thus includes within its scope all means constituting technical equivalents of the means hereinabove described as well as all combinations of such means.

What is claimed is:

1. A device for training a trainee driver in the operation of a moving vehicle in an operating station, comprising:
    an anamorphic system optically compressing a landscape moving in front of a moving vehicle while a model driver steers the moving vehicle, the optical compression being in a steering direction of the moving vehicle;
    means for recording on a videodisk the optically compressed moving landscape and, simultaneously, corresponding model steering data from the steering of the model driver;
    a display window;
    means comprising reading the videodisk for producing on the display window an image of an electronically selected portion of the optically compressed image of a moving landscape, the optically compressed image being electronically expanded to compensate for the optical compression;
    a steering element in front of the display window for operation by a trainee driver;
    means for providing data on the operation of the steering element by the trainee driver;
    means for reading the model steering data corresponding to the image of the moving landscape produced on the display window;
    means comparing the red model steering data with the data from the operation of the steering element by the trainee driver for determining any steering error made by the trainee driver; and
    means for electronically controlling a displacement the selected portion of the expanded image of the moving landscape relative to the display window as a function of the steering error.

2. A device for training a trainee driver in the operation of a moving vehicle in an operating station comprising:
    an anamorphic system optically compressing a landscape moving in front of a moving vehicle while a model driver steers the moving vehicle, the optical compression being in a steering direction of the moving vehicle;
    means for recording on a videodisk the optically compressed moving landscape and, simultaneously, corresponding model steering data from the steering of the model driver;
    a display window;
    a videodisk producing an electronically selected image portion of a previously recorded and optically compressed image of a moving landscape which has passed in front of a moving vehicle while a model driver steers the moving vehicle, and which has been expanded to compensate for the optical compression onto the display window;
    a steering element positioned in front of the display window for operation by a trainee driver;
    means for providing data on the operation of the steering element by a trainee driver;
    means for reading the model driver steering data corresponding to the electronically selected image portion of the moving landscape produced on the display window simultaneously with the reading of the videodisk for the expanded image;
    means for comparing the read model steering data with the data from the operation of the steering element by the trainee driver for determining any steering error made by the trainee driver; and means for electronically controlling a displacement of the selected portion of the expanded image of the moving landscape relative to the display window as a function of the steering error.

3. A method of training a trainee driver in the operation of a moving vehicle, comprising:

optically compressing images of a landscape moving in front of a moving vehicle through an anamorphic system while a model driver steers the moving vehicle, the optically compressed images being in a steering direction of the moving vehicle;

recording on a videodisk the optically compressed images of the moving landscape and, simultaneously, recording corresponding model steering data from the steering of the model driver;

producing by reading the videodisk expanded images of the optically compressed images of the moving landscape, said expanded images being expanded in said one direction corresponding to said direction of steering of the model driver by a value corresponding to an inverse ratio of said expanded image to an image of the anamorphic system;

electronically selecting a portion of said expanded image;

controlling a display of said electronically selected portion of said expanded image on a display window in front of a trainee driver operating steering equipment;

reading the model steering data from the videodisk corresponding to the moving landscape of the electronically selected portion of said expanded image produced on the display window simulatenously with the reading of the videodisk for the expanded image;

determining any steering error made by the trainee driver by comparing the read model steering data with data from the operation of the steering element by the trainee driver; and electronically controlling a displacement of said electronically selected portion of said expanded image of the moving landscape relative to the display window as a function of the steering error of the trainee driver.

4. A method according to claim 3, which comprises carrying out said expansion by amplification of the scanning-beam current in the direction of compression derived from said compressed image video signal and selecting said portion of the expanded recording by displacement of the mean current value.

5. A method according to claim 4, wherein said landscape recording comprises producing a compressed-image video signal from pictures taken with an anamorphic lens.

6. A method according to claim 4, which comprises determining the steering errors from the variation in orientation of the steering element during a unitary time interval by making a comparison between the steering control operation of the trainee driver and a recording carried out on the model-driver control operations at a constant speed of travel imposed on the vehicle.

7. A method according to claim 4, wherein said recording of steering control operations performed by the model driver is located in one videodisk channel which is normally reserved for sound.

* * * * *

UNITED STATES PATENT AND TRADEMARK OFFICE
CERTIFICATE OF CORRECTION

PATENT NO. : 4,750,888

DATED : June 14, 1988

INVENTOR(S) : Jean-Claude Allard

It is certified that error appears in the above-identified patent and that said Letters Patent is hereby corrected as shown below:

Column 6, line 30 for "red" read -- read --.

Column 8, line 23 for "4" read -- 5 --.

Signed and Sealed this

Thirty-first Day of October, 1989

Attest:

DONALD J. QUIGG

Attesting Officer

Commissioner of Patents and Trademarks